(12) United States Patent
Toda

(10) Patent No.: US 9,222,505 B2
(45) Date of Patent: Dec. 29, 2015

(54) THRUST BEARING

(71) Applicant: DAIDO METAL COMPANY LTD., Nagoya (JP)

(72) Inventor: Kazuaki Toda, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 14/196,140

(22) Filed: Mar. 4, 2014

(65) Prior Publication Data

US 2014/0270611 A1    Sep. 18, 2014

(30) Foreign Application Priority Data

Mar. 13, 2013   (JP) .................................. 2013-051034

(51) Int. Cl.
  *F16C 17/04*   (2006.01)
  *C22C 38/16*   (2006.01)
  *F16C 33/12*   (2006.01)

(52) U.S. Cl.
  CPC ................. *F16C 17/04* (2013.01); *C22C 38/16* (2013.01); *F16C 33/121* (2013.01); *F16C 33/122* (2013.01)

(58) Field of Classification Search
  CPC ........ F16C 17/04; F16C 33/12; F16C 33/121; F16C 33/122; F16C 33/124; F16C 33/125; F16C 33/127; F16C 33/145; F16C 2204/10; F16C 2204/12; F16C 2204/14; F16C 25/04; F16C 27/02; C22C 38/16
  USPC ......... 384/129, 276–280, 294, 420, 425, 907, 384/912, 913
  See application file for complete search history.

(56) References Cited

U.S. PATENT DOCUMENTS

| | | | |
|---|---|---|---|
| 7,078,107 B2 * | 7/2006 | Takayama et al. | 384/912 |
| 8,273,465 B2 * | 9/2012 | Izumida et al. | 384/912 |
| 2002/0071619 A1 | 6/2002 | Tabuti et al. | |
| 2010/0086426 A1 * | 4/2010 | Ohkawa et al. | 384/279 |
| 2012/0020592 A1 * | 1/2012 | Schmitt et al. | 384/42 |
| 2012/0064365 A1 | 3/2012 | Takayanagi et al. | |

FOREIGN PATENT DOCUMENTS

| | | |
|---|---|---|
| DE | 102006048311 | 4/2008 |
| DE | 102011013881 | 5/2012 |
| JP | 06-192774 | 7/1994 |
| JP | 11-201145 | 7/1999 |

OTHER PUBLICATIONS

Extended European Search Report dated Jun. 25, 2014 from corresponding European patent application Serial No. EP 14158511 (four pages).

* cited by examiner

*Primary Examiner* — James Pilkington
(74) *Attorney, Agent, or Firm* — Harness, Dickey & Pierce, PLC

(57) ABSTRACT

A thrust bearing including a back metal layer and a sliding layer joined to a front face of the back metal layer. The thrust bearing having a thickness. The back metal layer includes an intermediate sub-layer and a buffer sub-layer disposed on a back face of the back metal layer. The sliding layer is joined to the intermediate sub-layer. Both of the sub-layers include iron or an iron alloy, and the buffer sub-layer has a thickness of 2 to 20% relative to the thickness of the thrust bearing, and a porosity ratio of 10 to 50%.

4 Claims, 3 Drawing Sheets

THRUST BEARING

INCORPORATION BY REFERENCE

The present application claims priority from JP Patent Application Ser. No. 2013-051034 filed on Mar. 13, 2013, the content of which is hereby incorporated by reference into this application.

BACKGROUND OF THE INVENTION

1. Field of the Invention

The present invention relates to a thrust bearing including a back metal layer and a sliding layer joined to a front surface of the back metal layer, and also relates to a thrust bearing suitable for use in a crank shaft or a turbocharger of an internal combustion engine or the like.

2. Description of Related Art

As conventional thrust bearings for use in crank shafts of internal combustion engines, sliding bearing has been used which includes a bearing alloy layer made of white metal, a copper alloy, an aluminum alloy, or the like, and a back metal layer for enhancing strength of the bearing (see JP-A-06-192774, for example). Such a thrust bearing for a crank shaft is constituted by a two-piece half-cut thrust bearing, one piece of which is mounted to a cylinder block, and the other piece of which is mounted to a bearing cap. More specifically, as shown in FIG. 5 of JP-A-11-201145, in a bearing housing including a bearing cap mounted under a cylinder block, a seat receiver formed into a circular recessed portion is produced, and a thrust bearing for receiving a thrust collar of the crank shaft is disposed on this seat receiver so as to receive thrust load of the crank shaft on the thrust bearing.

SUMMARY OF THE INVENTION

When the crank shaft of the combustion engine rotates, its rotational force is transmitted from an end portion on an output side of a crank shaft via a clutch to a transmission. At this time, the thrust bearing receives load of an axial direction force generated in the axial direction of the crank shaft. A torque reaction force in the axial direction is generated immediately after the crank shaft comes into connection with the transmission from their disconnection state via the clutch, so that impact of an axial direction force F (see FIG. 6) is input into the crank shaft from its end portion on the output side, and the crank shaft is forced to be displaced in the reverse direction to the output side of the crank shaft.

The above-described axial direction force F of the crank shaft is a maximum load that is received on a sliding face of a sliding layer of the thrust bearing. As shown in FIG. 6, at the moment when impact of the axial direction force F of the crank shaft is received on the sliding face of a sliding layer 11 of a thrust bearing 13, shearing stress is caused due to difference in elastic deformation between the sliding layer 11 and a back metal layer 12 at an interface between the sliding layer 11 and the back metal layer 12. In this case, since difference in elastic deformation between the sliding layer 11 and the back metal layer 12 is large, the shearing stress generated at the interface becomes large, and thus fatigue is likely caused to the sliding layer 11 when the sliding layer 11 repetitively receives the axial direction force F of the crank shaft. An object of the present invention, which has been made in view of the problems described above, is to provide a thrust bearing capable of reducing the shearing stress caused at the interface by the axial direction force of the crank shaft generated at the time of sliding, thereby preventing fatigue damage from being caused to the sliding layer.

In order to attain the above object, a first aspect of the present invention provides a thrust bearing including a back metal layer, and a sliding layer joined to a front face of the back metal layer, wherein the back metal layer includes an intermediate sub-layer to which the sliding layer is joined, and a buffer sub-layer disposed on a back face of the back metal layer, both of the sub-layers include iron or an iron alloy, and the buffer sub-layer has a thickness of 2 to 20% relative to a thickness T of the thrust bearing, and has a porosity ratio of 10 to 50%.

According to a second aspect of the present invention, in the thrust bearing set forth in the first aspect, the sliding layer includes a copper alloy, the back metal layer has structure in which a copper or copper alloy phase is dispersed in matrix of iron or an iron alloy, and the copper alloy of the sliding layer comes into contact with the copper or copper alloy phase dispersed in the intermediate sub-layer at an interface between the sliding layer and the intermediate sub-layer.

According to a third aspect of the present invention, in the thrust bearing set forth in the second aspect, the copper alloy phase dispersed in the intermediate sub-layer includes a diffuse component dispersible from the intermediate sub-layer to the sliding layer.

According to a fourth aspect of the present invention, in the thrust bearing set forth in the third aspect, the diffuse component includes at least one kind of elements selected from an element group of Sn, Zn, and Ni.

DETAILED DESCRIPTION OF THE INVENTION

Figure 1:
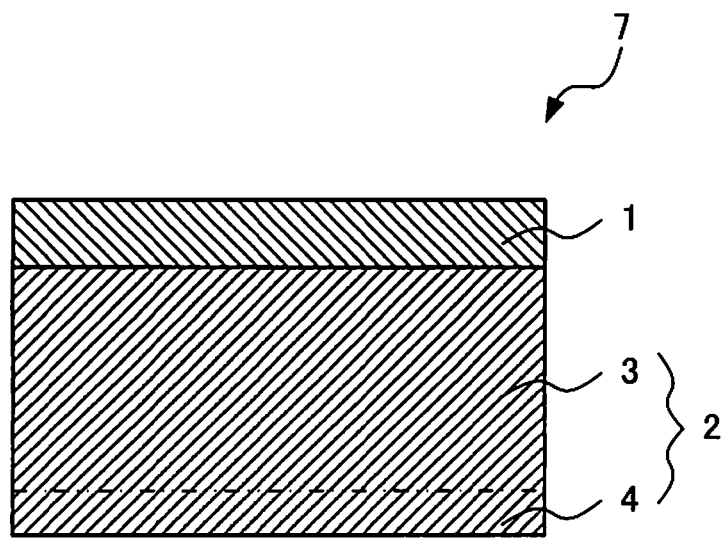
FIG. 1 is a schematic diagram showing a thrust bearing including a sliding layer, and a back metal layer that includes a buffer sub-layer and an intermediate sub-layer.

As set forth in the first aspect of the present invention shown in FIG. 1, a thrust bearing 7 includes a back metal layer 2, and a sliding layer 1 joined to the front face of the back metal layer 2, wherein the back metal layer 2 includes an intermediate sub-layer 3 to which the sliding layer 1 is joined, and a buffer sub-layer 4 disposed on the back face of the back metal layer 2. Although not shown in the figure, the thrust bearing 7 is formed in an annular shape or semi-annular shape, and is fit to and disposed in a bearing housing so as to receive thrust load of the crank shaft. Sufficient strength against load applied to the thrust bearing 7 can be sufficiently secured in the back metal layer 2 that includes the intermediate sub-layer 3 and the buffer sub-layer 4 by using iron or the iron alloy in the back metal layer 2. Meanwhile, the bearing alloy such as a Cu alloy, an Al alloy, a Sn alloy, and a Bi alloy may be used in the sliding layer 1.

Figure 2:
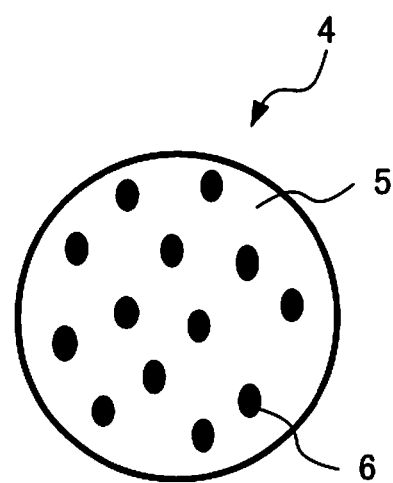
FIG. 2 is an enlarged view showing the buffer sub-layer included in the back metal layer.
Figure 3:
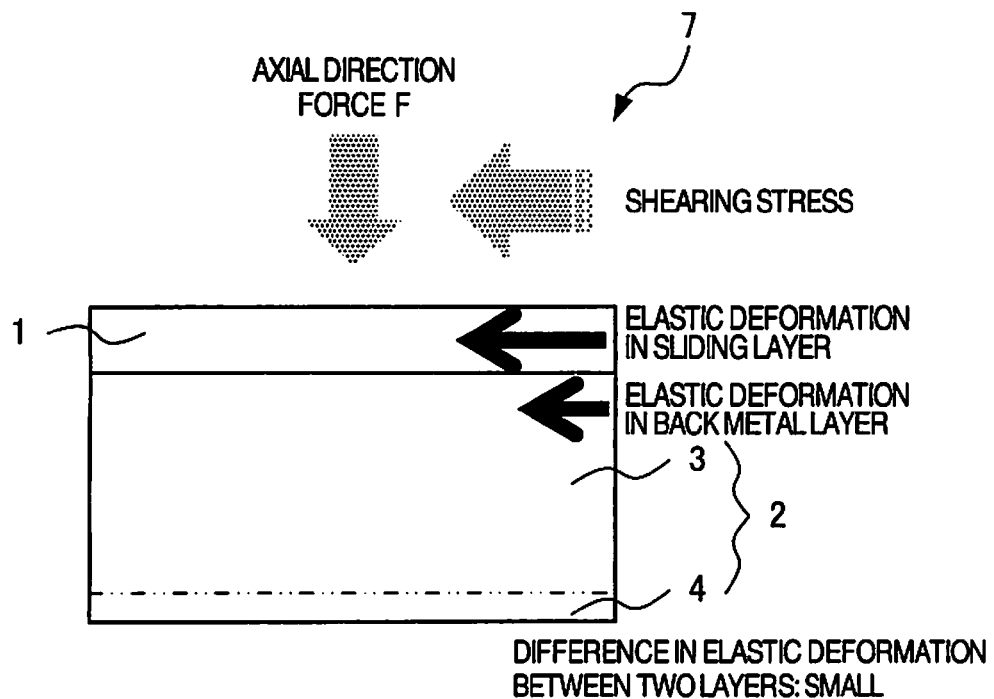
FIG. 3 is a schematic diagram explaining an effect of the buffer sub-layer for interface fatigue between the sliding layer and the back metal layer.

If impact of the axial direction force F of the crank shaft is received on the sliding face of the sliding layer 1 of the thrust bearing 7, elastic deformation is caused to the sliding layer 1, and the intermediate sub-layer 3 and the buffer sub-layer 4 constituting the back metal layer 2. As shown in FIG. 2, pores 6 are formed in the buffer sub-layer 4 containing an iron or iron alloy phase 5. If the porosity ratio of the buffer sub-layer 4 is set to be 10 to 50%, a large number of the pores 6 are formed inside the buffer sub-layer 4, and thus elastic deformation in the buffer sub-layer 4 becomes larger than that in the intermediate sub-layer 3. As shown in FIG. 3, in the case of providing such buffer sub-layer 4, elastic deformation due to the axial direction force F of the crank shaft in each of the sliding layer 1 and the intermediate sub-layer 3 of the back metal layer 2 becomes smaller than that in the case without the buffer sub-layer 4, resulting in relatively smaller difference in elastic deformation at the interface therebetween. Accordingly, shearing stress caused at the interface becomes smaller, thereby preventing fatigue damage from being caused to the sliding layer 1.

To the contrary, in the case without the buffer sub-layer 4 set forth in the first aspect of the present invention, if the axial direction force F of the crank shaft is received on the sliding face of the sliding layer 1, elastic deformation in each of the sliding layer 1 and the intermediate sub-layer 3 of the back metal layer 2 becomes larger, which increases difference in elastic deformation at the interface. Consequently, the shearing stress caused at the interface becomes larger, which likely causes fatigue to the sliding layer 1.

The porosity ratio of the buffer sub-layer 4 is set to be 10 to 50%, but in the case of the porosity ratio of less than 10%, elastic deformation in the buffer sub-layer 4 becomes smaller at the time of receiving the axial direction force F of the crank shaft on the sliding face of the sliding layer 1, and consequently, the effect of reducing the shearing stress caused at the interface between the sliding layer 1 and the back metal layer 2 becomes insufficient. On the other hand, in the case of the porosity ratio of more than 50%, strength of the buffer sub-layer 4 becomes excessively small, and thus plastic deformation or fatigue may be caused to the buffer sub-layer 4 when the axial direction force F is received on the sliding face of the sliding layer 1. Preferably, the porosity ratio of the buffer sub-layer 4 is within a range of 20 to 40%.

The thickness of the buffer sub-layer 4 is 2 to 20% of the thickness T of the thrust bearing 7, but if the buffer sub-layer 4 has a thickness of less than 2%, elastic deformation in the buffer sub-layer 4 becomes smaller when the axial direction force F of the crank shaft is received on the sliding face of the sliding layer 1, and consequently, the effect of reducing the shearing stress caused at the interface between the sliding layer 1 and the back metal layer 2 becomes insufficient. On the other hand, if the buffer sub-layer 4 has a thickness of more than 20%, strength in the back metal layer 2 including the buffer sub-layer 4 becomes smaller, which results in reduction in strength of the thrust bearing 7. Preferably, the thickness of the buffer sub-layer 4 is within a range of 5 to 13%. It is preferable to set the thickness of the buffer sub-layer 4 to be 10% or less relative to the thickness of the back metal layer 2. This is because the strength of the back metal layer 2 becomes smaller as the thickness ratio of the intermediate sub-layer 3 relative to the thickness of the back metal layer 2 becomes smaller, and thus the strength of the thrust bearing 7 becomes smaller.

The sliding layer 1 is preferably densified. The sliding layer 1 is, however, allowed to have a porosity ratio of less than 5% on average. Preferably, the intermediate sub-layer 3 included in the back metal layer 2 is also densified. The intermediate sub-layer 3 is, however, allowed to have a porosity ratio of less than 5% on average. For example, if not only the buffer sub-layer 4 but also the intermediate sub-layer 3 that constitute the back metal layer 2 are configured to contain a large number of pores, the back metal layer 2 does not function for enhancing the strength of the thrust bearing 7. If the number of the pores 6 is increased, the contact area between the sliding layer 1 and the intermediate sub-layer 3 becomes reduced at the interface of the two layers, and at the time of receiving impact of the load on the thrust bearing 7, the shearing stress acts only on contact portions of the two layers other than the pores in the intermediate sub-layer 3; thus shearing likely occurs, and fatigue is likely caused to the sliding layer 1.

As set forth in the second aspect of the present invention, the sliding layer 1 is made of a copper alloy, and examples of a specific composition of such a copper alloy may be Cu—Sn, Cu—Ni, and Cu—Zn compositions, etc. Among various bearing alloys, the copper alloy having such composition exhibits higher strength, and is suitable for use in the thrust bearing 7 for an internal combustion engine that receives impact of load. Specific additive amount (content) of the copper alloy is preferably within a range of 2 to 12% in the case of using Sn, 1 to 10% in the case of using Ni, and 10 to 40% in the case of using Zn.

Figure 4:
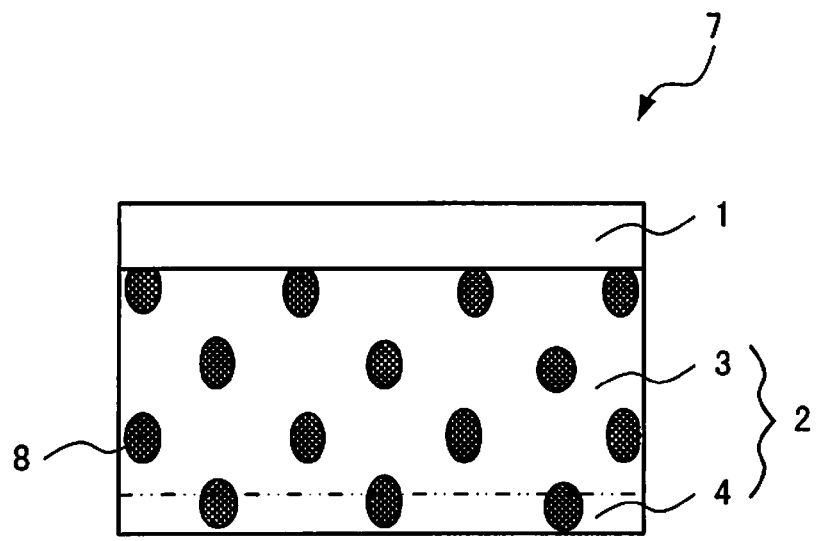
FIG. 4 is a schematic diagram showing the thrust bearing in which copper or a copper alloy is dispersed in the back metal layer.

The back metal layer 2 includes structure in which a copper or copper alloy phase 8 is dispersed in a matrix of iron or an iron alloy, and examples of a specific composition of the copper or copper alloy phase 8 may be Cu containing inevitable impurities, and Cu—Be, Cu—Mg, Cu—Al, Cu—Si, Cu—P, Cu—Ti, Cu—V, Cu—Cr, Cu—Co, Cu—Zr, Cu—Mo, and Cu—Te compositions, etc. As shown in FIG. 4, the copper alloy of the sliding layer 1 and the copper or copper alloy phase 8 dispersed in the intermediate sub-layer 3 come into contact with each other at the interface between the sliding layer 1 and the intermediate sub-layer 3, and thus Cu atoms become mutually diffused at the time of sintering, thereby enhancing the joining strength therebetween, which makes it difficult to cause fatigue from the interface between the sliding layer 1 and the intermediate sub-layer 3.

At the interface of the intermediate sub-layer 3 of the back metal layer 2 relative to the sliding layer 1, an area ratio of the copper or copper alloy phase 8 dispersed in the intermediate sub-layer 3 is preferably within a range of 30 to 70%. In the case of the area ratio of the copper or copper alloy phase 8 of less than 30%, diffusion of Cu atoms becomes smaller at the time of sintering, and the effect of enhancing the joining strength between the sliding layer 1 and the intermediate sub-layer 3 becomes insufficient. On the other hand, in the case of the area ratio of the copper or copper alloy phase 8 of more than 70%, the strength of the back metal layer 2 including the intermediate sub-layer 3 becomes smaller, and thus the strength of the thrust bearing 7 becomes lowered, resulting in deterioration of fatigue resistance.

Figure 5:
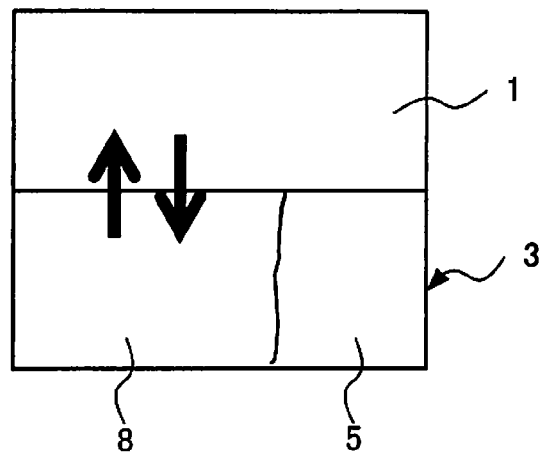
FIG. 5 is an enlarged view showing a region in the vicinity of the interface between the sliding layer and the back metal layer for the purpose of explaining diffusion of a diffuse component.
Figure 6:
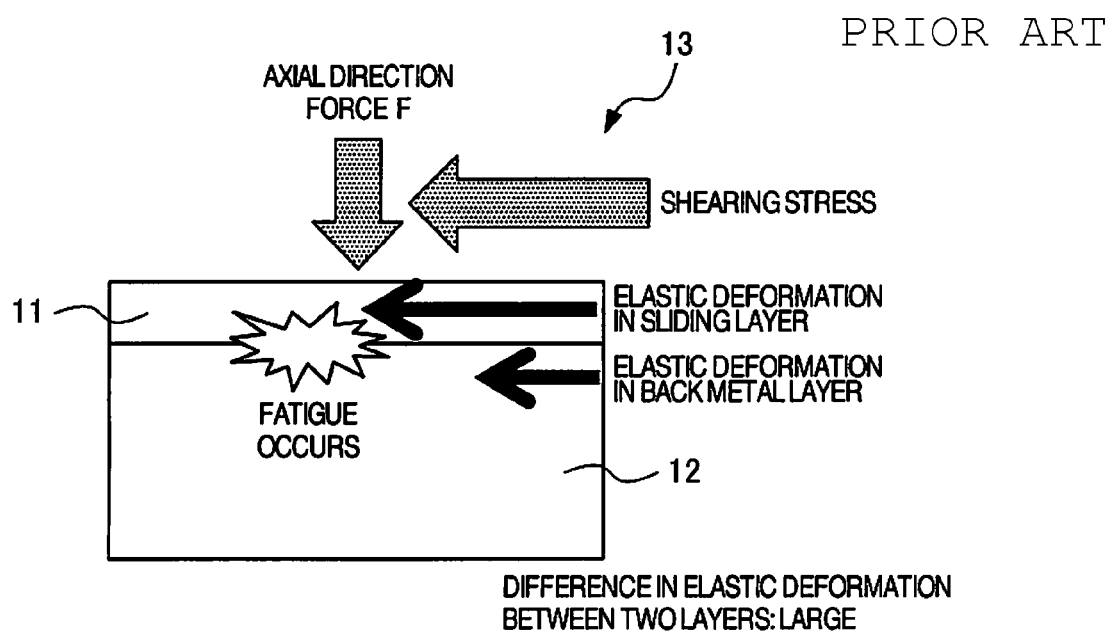
FIG. 6 is a schematic diagram explaining an interface fatigue mechanism between the sliding layer and the back metal layer in a conventional product.

As set forth in the third aspect of the present invention, the copper alloy phase 8 dispersed in the intermediate sub-layer 3 is configured to contain a diffuse component that can be dispersed from the intermediate sub-layer 3 to the sliding layer 1. The diffuse component refers to a component dissolved in the copper alloy phase 8 that is dispersed in the intermediate sub-layer 3. The diffuse component becomes dispersed from the intermediate sub-layer 3 to the sliding layer 1 at the interface between the sliding layer 1 and the intermediate sub-layer 3 at the time of sintering, thereby enhancing the joining strength between the sliding layer 1 and the intermediate sub-layer 3 included in the back metal layer 2. Particularly, if the diffuse component is contained also in the copper alloy of the sliding layer 1, as shown in FIG. 5, the diffuse component becomes dispersed not only from the intermediate sub-layer 3 to the sliding layer 1, but also from the sliding layer 1 to the intermediate sub-layer 3, thereby further enhancing the joining strength between the sliding layer 1 and the intermediate sub-layer 3 included in the back metal layer 2.

As set forth in the fourth aspect of the present invention, the diffuse component is configured to contain at least one kind of elements selected from an element group of Sn, Zn, and Ni. Specific additive amount (content) of the copper alloy phase 8 containing such diffuse component is preferably within a range of 2 to 12% in the case of using Sn, 1 to 10% in the case of using Ni, and 10 to 40% in the case of using Zn. In the case of containing the diffuse component not only in the copper alloy phase 8 dispersed in the intermediate sub-layer 3, but also in the copper alloy of the sliding layer 1, it is preferable to contain a common diffuse component therein. The aforementioned additive amount (content) of the diffuse component is not the additive amount (content) relative to the entire back metal layer 2, but the additive amount (content) relative to the copper alloy phase 8 dispersed in the back metal layer 2.

In the present invention, it is supposed that inevitable impurities are contained in iron, an iron alloy, copper, and a copper alloy. In the present invention, it is preferable that the intermediate sub-layer 3 and the buffer sub-layer 4 in the back metal layer 2 are integrally produced using the same composition. For example, if the intermediate sub-layer 3 and the buffer sub-layer 4 in the back metal layer 2 are produced in different compositions, fatigue is likely caused from the interface between the intermediate sub-layer 3 and the buffer sub-layer 4.

In order to enhance seizure resistance, soft metal such as Bi and Pb, or solid lubricant such as graphite, $Mo_2S$ and BN, may be added in the sliding sub-layer 1 of the present invention. An overlay layer may be applied onto the front face of the sliding layer 1 of the present invention so as to attain an initial conformability relative to a counterpart shaft. The thrust bearing 7 of the present invention is suitable as the thrust bearing 7 for use in a crank shaft or a turbocharger of an internal combustion engine, but the present invention is not limited to these usages.

A thrust bearing 7 according to the present embodiment that includes a sliding layer 1, and a back metal layer 2 including a buffer sub-layer 4 and an intermediate sub-layer 3 was produced in the procedure described below. In Examples 1 to 12, as metallic powder to be formed in the back metal layer 2, metallic power having each composition shown in Table 1 was compacted and pre-sintered, and thereafter a face of the compacted metallic power that was opposite to its front face (face to be a back face of the thrust bearing 7) to be joined to the sliding layer 1 was fixed so as to apply compression onto the front face of the compacted metallic power to be joined to the sliding layer 1 in one direction toward the back face thereof. This process densifies an inner portion as well as a surface of the intermediate sub-layer 3 included in the back metal layer 2, which was to be joined to the sliding layer 1, and at the same time, the buffer sub-layer 4 that included pores 6 thereinside was formed on the back face side of the thrust bearing 7, which was opposite to the compression side. A thickness and a porosity ratio of the buffer sub-layer 4 were controlled by changing its density at the time of compacting the metallic powder 2, or changing compression load at the time of applying the compression load after the compacting. Thereafter, as metallic power to be the sliding layer 1, metallic power having each composition shown in Table 1 was scattered on the denser surface of the back metal layer 2, and was compactedly sintered so as to join the back metal layer 2 and the sliding layer 1. The thickness of the sliding layer 1 was set to be 0.5 mm, and the thickness of the back metal layer 2 was set to be 2.5 mm. Through this producing procedure, as shown in FIG. 1, the thrust bearing 7 having an annular shape and including the sliding layer 1, and the back metal layer 2 that included the buffer sub-layer 4 and the intermediate sub-layer 3 was produced for use as a test specimen in a thrust fatigue test.

TABLE 1

| | Chemical Composition of Sliding Layer (mass %) | | | | | | Chemical Composition of Back Metal Layer (mass %) | | | | | | Buffer Sub-layer Thickness/ Total Thickness (%) | Vacancy Rate of Buffer Sub-layer (%) | Fatigue Limit Stress (MPa) |
|---|---|---|---|---|---|---|---|---|---|---|---|---|---|---|---|
| | | | | | | | Copper or Copper Alloy Phase | | | | | | | | |
| | Cu | Sn | Zn | Ni | Fe | C | Cu | Sn | Zn | Ni | Fe | C | | | |
| Example 1 | Balance | 10.0 | — | — | — | — | — | — | — | — | 100.0 | — | 3.1 | 14.2 | 120 |
| Example 2 | Balance | 10.0 | — | — | — | — | — | — | — | — | 99.9 | 0.1 | 2.1 | 10.3 | 120 |
| Example 3 | Balance | — | — | 3.0 | — | — | — | — | — | — | 99.9 | 0.1 | 20.0 | 48.9 | 120 |
| Example 4 | Balance | — | 30.0 | — | — | — | — | — | — | — | 99.9 | 0.1 | 10.5 | 27.9 | 125 |
| Example 5 | Balance | 8.0 | — | — | — | — | Balance | — | — | — | 49.95 | 0.05 | 8.9 | 22.1 | 130 |
| Example 6 | Balance | — | — | 7.0 | — | — | Balance | 0.5 | — | — | 49.95 | 0.05 | 13.4 | 19.8 | 135 |
| Example 7 | Balance | 7.0 | — | — | — | — | Balance | — | — | 2.5 | 49.95 | 0.05 | 15.0 | 14.6 | 140 |
| Example 8 | Balance | — | 25.0 | — | — | — | Balance | 3.5 | — | — | 49.95 | 0.05 | 7.6 | 34.3 | 140 |
| Example 9 | Balance | — | — | 5.0 | — | — | Balance | — | 13.0 | — | 49.95 | 0.05 | 9.6 | 25.5 | 140 |
| Example 10 | Balance | 10.0 | — | — | — | — | Balance | 5.0 | — | — | 49.95 | 0.05 | 4.9 | 44.4 | 145 |
| Example 11 | Balance | — | 25.0 | — | — | — | Balance | — | 13.0 | — | 49.95 | 0.05 | 17.2 | 16.3 | 145 |
| Example 12 | Balance | — | — | 5.0 | — | — | Balance | — | — | 2.5 | 49.95 | 0.05 | 11.1 | 31.2 | 145 |
| Comparative Example 1 | Balance | 5.0 | — | — | 49.95 | 0.05 | Balance | 5.0 | — | — | 49.95 | 0.05 | 100.0 | (25) | 55 |
| Comparative Example 2 | Balance | 10.0 | — | — | — | — | — | — | — | — | 99.9 | 0.1 | — | 0.0 | 75 |
| Comparative Example 3 | Balance | 10.0 | — | — | — | — | — | — | — | — | 100.0 | — | 1.6 | 8.0 | 75 |
| Comparative Example 4 | Balance | 10.0 | — | — | — | — | — | — | — | — | 100.0 | — | 1.8 | 15.5 | 80 |
| Comparative Example 5 | Balance | 10.0 | — | — | — | — | — | — | — | — | 100.0 | — | 6.9 | 9.3 | 80 |

TABLE 1-continued

| | Chemical Composition of Sliding Layer (mass %) | | | | | | Chemical Composition of Back Metal Layer (mass %) | | | | | | Buffer Sub-layer Thickness/ Total Thickness (%) | Vacancy Rate of Buffer Sub-layer (%) | Fatigue Limit Stress (MPa) |
|---|---|---|---|---|---|---|---|---|---|---|---|---|---|---|---|
| | | | | | | | Copper or Copper Alloy Phase | | | | | | | | |
| | Cu | Sn | Zn | Ni | Fe | C | Cu | Sn | Zn | Ni | Fe | C | | | |
| Comparative Example 6 | Balance | 10.0 | — | — | — | — | — | — | — | — | 100.0 | — | 24.5 | 56.1 | 75 |
| Comparative Example 7 | Balance | 10.0 | — | — | — | — | — | — | — | — | 100.0 | — | 21.0 | 45.0 | 80 |
| Comparative Example 8 | Balance | 10.0 | — | — | — | — | — | — | — | — | 100.0 | — | 16.8 | 50.6 | 80 |

The back metal layer 2 of Example 1 was produced by compacting and sintering Fe powder. Each back metal layer 2 of Examples 2 to 4 was produced by compacting and sintering S10C (Fe-0.1 mass % C alloy) as steel powder. Each back metal layer 2 of Examples 5 to 12 was produced by mixing the steel power used in Examples 2 to 4 and copper or copper alloy power having each "chemical composition of the back metal layer" shown in Table 1 in the case of mixing the steel power at a mass ratio of 50%, and thereafter compacting and sintering this mixed power. Elements of Cu, Sn, Zn, and Ni in the "chemical composition of the back metal layer" shown in Table 1 are elements pertinent to generating a copper or copper alloy phase 8, and the copper or copper alloy phase 8 containing these elements becomes a structure dispersed in the back metal layer 2.

In Examples 1 to 12, the thickness of the buffer sub-layer 4 relative to the thickness of the thrust bearing 7 (buffer sub-layer 4 thickness/total thickness shown in Table 1) was set to be within a range of 2 to 20%, and the porosity ratio of the buffer sub-layer 4 was set to be within a range of 10 to 50%. Each of Examples 1 and 2 was produced such that the thickness of the buffer sub-layer 4/total thickness and the porosity ratio of the buffer sub-layer 4 became approximately the lower limits of the above respective ranges. Example 3 was produced such that the thickness of the buffer sub-layer 4/total thickness and the porosity ratio of the buffer sub-layer 4 became approximately upper limits of the above ranges. Example 4 was produced such that the thickness of the buffer sub-layer 4/total thickness and the porosity ratio of the buffer sub-layer 4 became approximately the central values of the above ranges. Each porosity ratio was measured based on the photographs of the cross sectional structure magnified 100 times to 200 times using a general image analysis method (analyzing software: Image-Pro Plus (Version 4.5) manufactured by Planetron, Inc.).

Meanwhile, Comparative Example 1 was an annular thrust bearing including the sliding layer and the back metal layer having pores across the structure thereof (back metal layer whose entire structure was constituted by only a layer serving as the buffer sub-layer 4 in Examples, and including no sub-layer serving as the intermediate sub-layer 3). In Comparative Example 1, the steel powder used in Examples 2 to 4 and Cu-10 mass % Sn powder were mixed at a mass ratio of 50%, respectively, and were compactedly sintered into the back metal layer with pores remaining across the entire structure, and thereafter the sliding layer was formed in the same manner as those in Examples, thereby producing an annular thrust bearing. In Comparative Example 2, an annular thrust bearing was produced by using a conventional bimetal material produced by scattering Cu-10 mass % Sn powder to be the sliding layer on a steel back plate, and sintering, rolling, and then sintering this steel back plate. In Comparative Examples 3 to 8, each annular thrust bearing was produced using the same composition as that in Example 1, but was produced such that one or both of the thickness of the buffer sub-layer/total thickness and the porosity ratio of the sliding layer become out of their ranges: the range of 2 to 20% for the thickness of the buffer sub-layer/total thickness, and the range of 10 to 50% for the porosity ratio of the sliding layer. In Comparative Examples 1 to 8, each thickness of the sliding layer was set to be 0.5 mm, and each thickness of the back metal layer was set to be 2.5 mm.

Each thrust bearing of Examples 1 to 12 was produced to have a porosity ratio of less than 1% in the sliding layer 1, each thrust bearing of Comparative Examples 2 to 8 was produced to have a porosity ratio of less than 1% in the sliding layer 1. Each thrust bearing of Examples 1 to 12 was produced to have a porosity ratio of less than 5% on average in the intermediate sub-layer 3 included in the back metal layer 2, and each thrust bearing of Comparative Examples 2 to 8 was also produced to have a porosity ratio of less than 5% on average in the intermediate sub-layer included in the back metal layer. In all Examples 1 to 12, the pores 6 in the structure of the buffer sub-layer 4 had a diameter of 200 μm or less, and in all Comparative Examples 1 and 3 to 8, the pores in the structure of the buffer sub-layer also had a diameter of 200 μm or less.

A thrust fatigue test was conducted using a thrust fatigue tester on Examples 1 to 12 and Comparative Examples 1 to 8 each using the thrust bearing 7 according to the present embodiment. Table 2 shows test conditions of the thrust fatigue test. In this thrust fatigue test, it was assumed that impact load was applied onto the thrust bearing 7 through the crank shaft, and the test was carried out in such a manner that an axial direction force was periodically applied from a counterpart shaft in a rotating state onto the sliding face of the thrust bearing 7. In Examples 1 to 12, and in Comparative Examples 1 to 8, observation was conducted on the sliding face of each thrust bearing 7 to check the limit stress in which no fatigue resulting from occurrence of cracking was generated, and results of this test are shown in "Fatigue Limit Stress" of Table 1. The generation of cracking was visually observed.

TABLE 2

| Test Condition | |
|---|---|
| Tester | Thrust Tester |
| Test Specimen Dimension | Uuter Diameter of φ50 mm Inner Diameter of φ40 mm Thickness of 3 mm |
| Number of Rotation | 10 m/Sec |
| Frequency | 10 Hertz |

TABLE 2-continued

| Test Condition | |
|---|---|
| Test Time | 8 Hours |
| Lubricant | In-oil |
| Lubricant Oil | 10W-30 |
| Counterpart Shaft Material | S50C Hardened Shaft |

Each of Examples 1 to 4 had greater fatigue limit stress compared to those of Comparative Examples 1 to 8. This is estimated because the buffer sub-layer 4 of the back metal layer 2 became elastically deformed when an axial direction force was applied from the counterpart shaft in a rotating state, and thus shearing stress generated at the interface between the sliding layer 1 and the intermediate sub-layer 3 of the back metal layer 2 became smaller.

Example 5 had further greater fatigue limit stress compared to those of Comparative Examples 1 to 4. This is estimated because Example 5 had a structure in which the copper phase 8 was dispersed in the back metal layer 2, and thus Cu atoms were mutually diffused in a portion where the copper alloy of the sliding layer 1 and the copper phase 8 of the intermediate sub-layer 3 in the back metal layer 2 came in contact with each other at the interface between the sliding layer 1 and the intermediate sub-layer 3 of the back metal layer 2 at the time of sintering, thereby enhancing the joining strength between the sliding layer 1 and the intermediate sub-layer 3 of the back metal layer 2.

Each of Examples 6 to 9 had further greater fatigue limit stress compared to that of Example 5. This is estimated because the copper alloy of the sliding layer 1 and the copper alloy phase 8 of the intermediate sub-layer 3 in the back metal layer 2 contained Sn, Zn, and Ni as diffuse components, and not only Cu atoms but also atoms of Sn, Zn, and Ni that were the diffuse components were mutually diffused between the copper alloy of the sliding layer 1 and the copper alloy phase 8 of the intermediate sub-layer 3 in the back metal layer 2 at the interface between the sliding layer 1 and the intermediate sub-layer 3 of the back metal layer 2 at the time of sintering, thereby enhancing the joining strength between the sliding layer 1 and the intermediate sub-layer 3 of the back metal layer 2.

Each of Examples 10 to 12 contained the same diffuse component (any one of Sn, Zn, and Ni) in the copper alloy of the sliding layer 1 and in the copper alloy phase 8 of the intermediate sub-layer 3 in the back metal layer 2. This structure more likely encourages mutual diffusion of the diffuse component, and the copper alloy of the sliding layer 1 and the copper alloy phase 8 of the intermediate sub-layer 3 in the back metal layer 2, thereby further enhancing the fatigue limit stress.

To the contrary, in Comparative Example 1, fatigue was caused inside the back metal layer with a smaller stress than those of Examples 1 to 12. This is estimated because the back metal layer generally contained a large number of pores, and strength in the back metal layer became excessively small, and thus fatigue was likely caused even with a small stress. In Comparative Example 2, fatigue was caused in the sliding layer even with a smaller stress than those in Examples 1 to 12. This is estimated because no buffer sub-layer was formed in the back metal layer, and elastic deformation became greater in each of the sliding layer and the back metal layer at the interface therebetween when stress was applied; therefore, difference in elastic deformation therebetween became larger, which resulted in increase in shearing stress produced at this interface.

In each of Comparative Examples 3 to 5, fatigue was caused in the sliding layer with a smaller stress than those in Examples 1 to 12. This is estimated because one or both of the thickness of the buffer sub-layer/total thickness and the porosity ratio of the sliding layer were less than the lower limits of their ranges: the range of 2 to 20% for the thickness of the buffer sub-layer/total thickness, and the range of 10 to 50% for the porosity ratio of the sliding layer, so that the effect of reducing the shearing stress produced at the interface between the sliding layer and the back metal layer became insufficient. In each of Comparative Examples 6 to 8, fatigue was caused in the sliding layer with a smaller stress than those in Examples 1 to 12. This is estimated because one or both of the thickness of the buffer sub-layer/total thickness and the porosity ratio of the sliding layer were more than the upper limits of their ranges: the range of 2 to 20% for the thickness of the buffer sub-layer/total thickness, and the range of 10 to 50% for the porosity ratio of the sliding layer, so that the strength of the buffer sub-layer became smaller, which caused fatigue.

In the present embodiment, it has been described that the thrust bearing 7 has the sliding layer 1 formed across the entire front face of the back metal layer 2, but the present invention is not limited to this. For example, the sliding layer 1 may be formed on a part of the front face of the back metal layer 2. It is general that the thickness of the sliding layer 1 is set to be uniform across the entire sliding face of the thrust bearing 7, but the present invention is not limited to this, and the thickness of the sliding layer 1 may be partially changed. Similarly, it is preferable to set the thickness of the buffer sub-layer 4 to be uniform across the entire back face of the thrust bearing 7, but the present invention is not limited to this, and the thickness of the buffer sub-layer 4 may be partially changed.

The invention claimed is:

1. A thrust bearing comprising: a back metal layer; and a sliding layer including a copper alloy joined to a front face of the back metal layer, the thrust bearing having a thickness,
   wherein the back metal layer comprises an intermediate layer and a buffer sub-layer, the buffer sub-layer forming a back face of the back metal layer, the intermediate layer forming the front face to which the sliding layer is joined,
   both the intermediate layer and the buffer sub-layer include iron or an iron alloy,
   the buffer sub-layer has a thickness of 2 to 20% relative to the thickness of the thrust bearing and has a porosity ratio of 10 to 50%, and
   the intermediate layer has a porosity ratio of less than 5%.

2. The thrust bearing according to claim 1, wherein the back metal layer has a structure comprising a matrix of iron or an iron alloy and a copper or copper alloy phase, the copper or copper alloy phase being dispersed in the matrix of iron or an iron alloy, and
   the copper alloy of the sliding layer comes into contact with the copper or copper alloy phase dispersed in the intermediate layer at an interface between the sliding layer and the intermediate layer.

3. The thrust bearing according to claim 2, wherein the copper alloy phase dispersed in the intermediate layer includes a diffuse component diffusible from the intermediate layer to the sliding layer.

4. The thrust bearing according to claim 3, wherein the diffuse component includes at least one of elements selected from a group of Sn, Zn, and Ni.

* * * * *